2 Sheets—Sheet 1.

G. HALL, Jr. & G. W. AVERELL.

MACHINE FOR PRINTING ON SPOOLS.

No. 7,059. Reissued April 18, 1876.

WITNESSES:

W. W. Hollingsworth

Solon C. Kemon

INVENTOR:

G. Hall Jr.

G. W. Averell

BY Kemon & Co

ATTORNEYS.

2 Sheets—Sheet 2.

G. HALL, Jr. & G. W. AVERELL.

MACHINE FOR PRINTING ON SPOOLS.

No. 7,059. Reissued April 18, 1876.

WITNESSES:

W. W. Hollingsworth

Geo. C. Kenon

INVENTOR:

G. Hall Jr.

G. W. Averell

BY

Kenon & Co

ATTORNEYS.

UNITED STATES PATENT OFFICE.

GARDINER HALL, JR., OF SOUTH WILLINGTON, CONNECTICUT, AND GEORGE W. AVERELL, OF NEW YORK, N. Y., ASSIGNORS TO GARDINER HALL, JR.

IMPROVEMENT IN MACHINES FOR PRINTING ON SPOOLS.

Specification forming part of Letters Patent No. 102,257, dated April 26, 1870; reissue No. 7,059, dated April 18, 1876; application filed April 4, 1876.

DIVISION A.

*To all whom it may concern:*

Be it known that GARDINER HALL, Jr., of South Willington, in the county of Tolland and State of Connecticut, and GEORGE W. AVERELL, of the city, county, and State of New York, did invent a new and useful Improvement in Machines for Printing Spools; and I do hereby declare that the following is a full, clear, and exact description of the same, reference being had to the accompanying drawings, forming part of this specification, in which—

Figure 1:
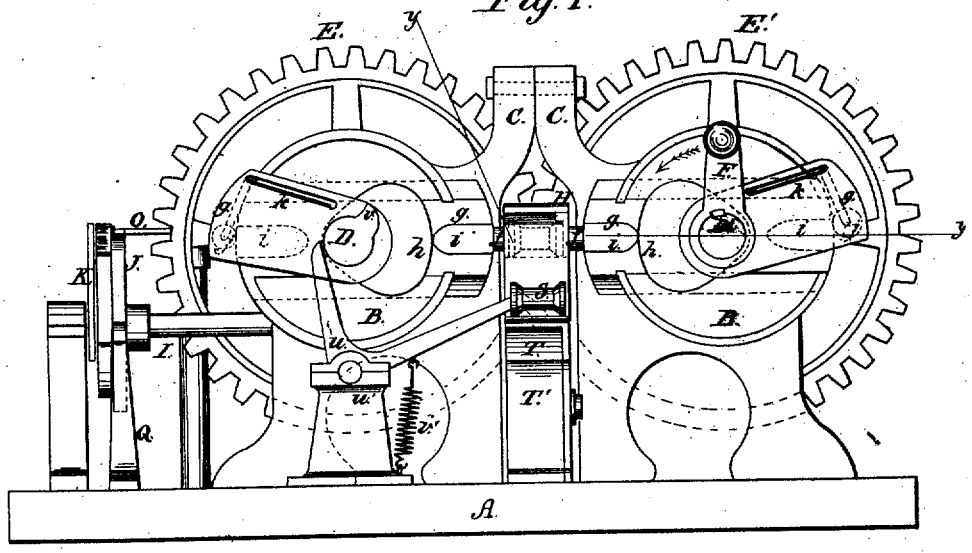
Figure 2:
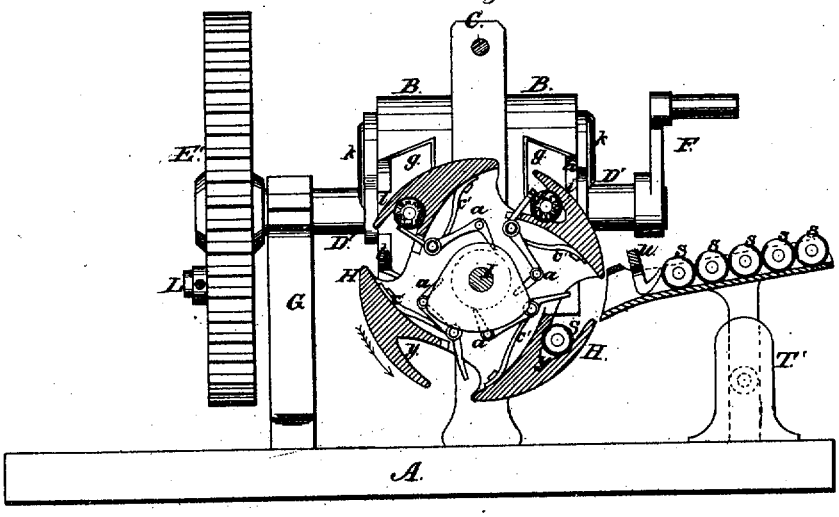
Figure 3:
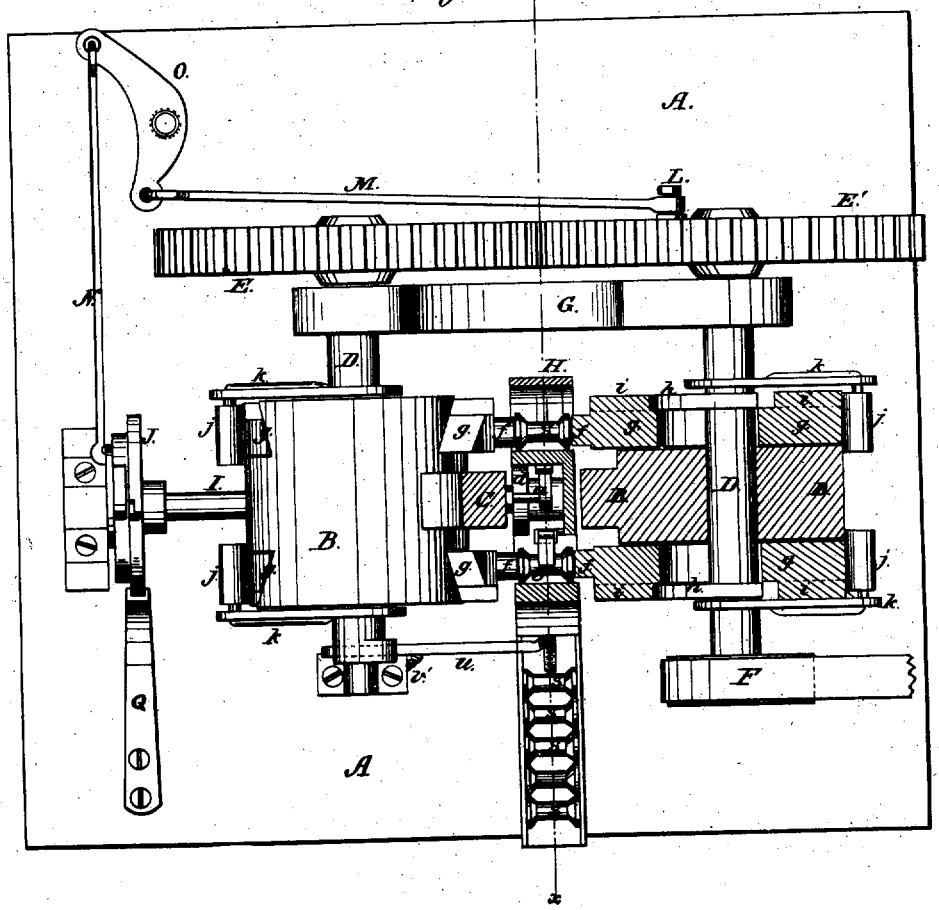
Figure 4:
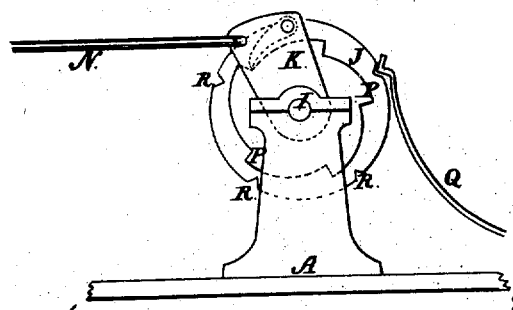

Figure 1, Sheet I, represents a side elevation of the machine. Fig. 2, Sheet I, is a vertical cross-section of Fig. 3 on the line *x x*. Fig. 3, Sheet II, is a section of Fig. 1 on the line *y y*. Fig. 4, Sheet II, is a detailed view of the mechanism by which the intermitting motion is produced.

This invention relates to a new and useful improvement in a machine for printing or labeling spools for holding thread or other material of like nature; and consists in the use of a series of dies, and in connection therewith the several mechanisms for producing the movements necessary to accomplish the object in view, the main object being to print both ends of the spool directly upon the wood while the spool is passing through the machine, but which mechanism may be applied to printing upon paper upon the ends of the spool, or which, with slight modifications, may be applied to printing the ends separately, either upon the wood, or upon paper or other material on the ends of the spool, as will be hereinafter more fully described.

A is the platform, upon which the operating parts of the machine are supported. B B are stationary barrels of cylindrical form, which are supported on suitable stands, and which are connected together above the central space between them by the lugs C C. Through the center of each of the barrels B B there passes a shaft, D D′. E E′ are gear-wheels on the ends of the shafts, which wheels engage with each other, so that the shafts revolve together with a uniform motion.

Motion is imparted by means of belt or gearing, in place of the crank F, or by any other suitable means.

G, Fig. 3, represents a stand, by which the back ends of the shafts are supported. H is a skeleton spool-wheel, which is made to revolve with an intermitting motion between the barrels B B on the shaft I. This shaft is placed at right angles with the shafts D D′, and is supported by the stands which support the barrels B B.

The intermitting motion of the wheel H is produced by means of the ratchet-wheel J, which is fast on the shaft I.

K is a plate, loose on the shaft I outside of the ratchet-wheel J, which is given an oscillating motion from the wrist-pin L in the gear-wheel E′ by means of the connecting-rods M N and the horizontal lever O. The plate K carries a pawl, (seen in dotted lines in Fig. 4,) which engages with the teeth P of the wheel J, and rotates the shaft I and wheel H with an intermitting motion. Q is a spring, which engages with the notches R in the outer rim of the ratchet-wheel for preventing back motion, and holding the wheel steady.

While the shafts D D′ are given a constant motion the skeleton wheel H, which carries the spools, is stopped at uniform periods, and remains stationary while the spools are received, and while they are printed.

S represents the spools, which are fed into the wheel H from the inclined chute T, which chute is supported by the stand T′. *u* is a feed-regulator, which bears upon the spools, and prevents more than one spool from entering the wheel H during one intermitting period.

The regulator is pivoted to the stand *w*′, and is in the form of a bell-crank. One arm of the bell-crank reaches to and bears upon or against the spools, while the other is operated upon by the cam *v* on the end of the shaft D. When this cam comes in contact with the arm it raises the other arm, and allows the spools to roll down far enough to allow one spool to enter the wheel when the cam leaves the upright arm.

When the cam leaves the upright arm the spring $v'$ acts upon the other, and brings it down in contact with the forward spool in the chute. This movement is timed so as to exactly correspond with the resting periods of the spool-wheel. The spool falls into the cavities $y$, which cavities may be either circular or angular. The latter form is preferred, as spools of different diameters may be held steady therein.

Each cavity $y$ is provided with a bell-crank shaped holder, $a$, one arm of which is lightly pressed upon the spool by the small spring $c'$, while the other arm is acted upon by the double stationary cam $d$ in such a manner that, after the spool has been printed, the other arm is released from the spools, which is allowed to drop from the wheel onto the platform, or through the platform into a proper receptacle.

$f$ represents the dies, which are moved horizontally toward the center, and in contact with the ends of the spools from each of the barrels B B.

In this example of my invention I use four dies, by which I am enabled to print the ends of the spools in two colors; but I do not limit myself to this particular number. More dies may be employed, so that the spools may be printed in a greater variety of colors, if desired.

$g$ represents the die-plates, which are dovetailed into the ends of the barrels B B, and are given a reciprocating horizontal motion by means of cams on the shafts D D′. $h$ represents the cams, which act against the lugs $i$ on the die-plates.

The movement of the dies corresponds exactly with the movement of the spool-wheel, so that at the periods of rest of that wheel they are brought in contact with the ends of the spools, as seen in Fig. 3. The spool receives one color from one pair of dies, and another color from the other pair.

$j$ represents the inking-rollers, which are attached to the plates $k$ on the shafts D D′. They are, consequently, made to traverse continuously in one direction the peripheries of the barrels B B, from which they receive their ink or coloring matter, and pass over the ends of the dies when the latter are drawn back, on which they leave the necessary quantity of ink or color for giving the impression to the spools.

There may be more of these inking-rollers, and they may have a longitudinal vibrating motion for more properly distributing the ink on the surface of the heads. Any suitable device may be employed for supplying the heads with the coloring-matter.

It will be seen that by slightly modifying the machine the ends of a spool may be printed at different times while the spool is passing through the machine; or one end only of the spool may be printed, and the other left blank.

The dies may be made stationary instead of movable, so that the spool would be pressed up against the die. Especially might this be done when the ends of the spool were not printed simultaneously; but such methods of printing, or such modifications in the machine, would not affect my invention.

I do not, at present, anticipate making such modifications, or adopting such methods of printing. Neither do I design to print on a paper surface. I intend to print directly upon the wood surface of the spools, and to print both ends of the spool at the same time, but do not confine myself exclusively thereto.

Havingthus described the said invention of HALL and AVERELL, I claim as new and desire to secure by Letters Patent—

1. In a machine for printing on spools the combination, with a spool-carrier, of a set of reciprocating dies, and an intermittently-operating feeding device, as and for the purpose described.

2. In a machine for printing on spools, the intermittently-revolving skeleton spool-carrier H, revolving in vertical planes, and having spool-cavities $y$, in combination with the holders $a$, as and for the purpose described.

3. The combination of the intermittently-revolving skeleton spool-carrier H with the shaft I, plate K, ratchet-wheel J, connecting-rods M N, lever O, and the wheel E′, as and for the purpose described.

4. The combination, with oppositely-operating printing-dies, of an intermittently-revolving spool-carrier, located between the same, substantially as and for the purpose described.

5. The combination of an intermittently-revolving spool-carrier with the reciprocating dies, and an intermittently-operating feeding device, substantially as described.

6. The combination, with the barrel B, of the die-plates $g$, dovetailed in guides therein, and carrying dies $f$ and lugs $i$, and the shaft D, carrying cams $h$, as and for the purpose described.

7. The combination, with barrels B and the reciprocating dies $f$ contained therein, of the plates $k$, attached to shafts D, and carrying inking-rollers $j$, adapted to revolve upon the periphery of the barrel, and ink the surface of the dies $f$ when the latter are withdrawn from the spool, as described.

8. The synchronously-revolving wheels E E′, geared together, and combined with shafts D D′, the reciprocating dies, barrels B B, and the intermittently-revolving spool-carrier, located between the said dies, substantially as and for the purpose described.

9. In a machine for printing spools the combination of an inclined chute, T, the intermittently-rotating spool-carrier, and an intermittently-operated feed-regulator, as described.

10. The feeding device T and rotating carrier 11, combined with reciprocating dies $f$ $f$, constructed as and for the purpose described.

11. The combination, with a carrier-wheel

H, dies *f*, and feeding-chute T, of a revolving shaft, D, cams *h v*, and lever *u u'*, whereby a corresponding number of spools will always be fed in and headed automatically.

12. The combination of the stationary cam *d* with the lever *a* and spring *c'*, as shown and described, to hold the spool while being imprinted, and allow its exit from the chamber at the time and in the manner set forth.

G. HALL, JR.

Witnesses:
EDWD. W. BYRN,
CHAS. A. PETTIT.